United States Patent
Serita et al.

(10) Patent No.: US 11,120,383 B2
(45) Date of Patent: Sep. 14, 2021

(54) SYSTEM AND METHODS FOR OPERATOR PROFILING FOR IMPROVING OPERATOR PROFICIENCY AND SAFETY

(71) Applicant: Hitachi, Ltd., Tokyo (JP)

(72) Inventors: Susumu Serita, San Jose, CA (US); Haiyan Wang, Fremont, CA (US); Chetan Gupta, San Mateo, CA (US)

(73) Assignee: Hitachi, Ltd., Tokyo (JP)

( * ) Notice: Subject to any disclaimer, the term of this patent is extended or adjusted under 35 U.S.C. 154(b) by 367 days.

(21) Appl. No.: 15/993,344

(22) Filed: May 30, 2018

(65) Prior Publication Data

US 2019/0370722 A1 Dec. 5, 2019

(51) Int. Cl.
| | |
|---|---|
| *G06Q 10/00* | (2012.01) |
| *G06Q 10/06* | (2012.01) |
| *G06Q 50/20* | (2012.01) |
| *G06Q 50/04* | (2012.01) |
| *G06N 20/00* | (2019.01) |
| *G06Q 50/28* | (2012.01) |
| *H04W 4/38* | (2018.01) |

(52) U.S. Cl.
CPC ....... *G06Q 10/06398* (2013.01); *G06N 20/00* (2019.01); *G06Q 10/0637* (2013.01); *G06Q 10/063116* (2013.01); *G06Q 50/04* (2013.01); *G06Q 50/2057* (2013.01); *G06Q 50/28* (2013.01); *H04W 4/38* (2018.02)

(58) Field of Classification Search
None
See application file for complete search history.

(56) References Cited

U.S. PATENT DOCUMENTS

| | | | |
|---|---|---|---|
| 9,099,009 B2* | 8/2015 | Sowadski | G09B 9/44 |
| 2007/0203711 A1* | 8/2007 | Nation | G09B 5/00 |
| | | | 434/350 |
| 2009/0182460 A1* | 7/2009 | O'Neal | B60R 25/00 |
| | | | 701/2 |
| 2013/0275187 A1* | 10/2013 | Patel | G06Q 10/06398 |
| | | | 705/7.42 |
| 2014/0278569 A1 | 9/2014 | Sanchez et al. | |
| 2015/0186817 A1* | 7/2015 | Kim | G06Q 10/0635 |
| | | | 705/7.28 |

(Continued)

OTHER PUBLICATIONS

Cherkasky, T. D. (1999). Design style: A method for critical analysis of design applied to workplace technologies (Order No. 9945530). Available from ProQuest Dissertations and Theses Professional (Year: 1999).*

(Continued)

*Primary Examiner* — Gurkanwaljit Singh
(74) *Attorney, Agent, or Firm* — Procopio, Cory, Hargreaves & Savitch LLP

(57) ABSTRACT

A system is provided for operator profiling based on pre-installed sensor measurement. In example implementations, the system extracts a set of segmented time series data associated with a unit of operation and build models which distinguish the operators by machine learning algorithms. The system uses the models to output the evaluation score assigned to each operation, identify the key movements for skilled/non-skilled operators, and recommends appropriate actions to improve operation skill or adjust the scheduling of the operators.

16 Claims, 14 Drawing Sheets

(56) References Cited

U.S. PATENT DOCUMENTS

2015/0269244 A1* 9/2015 Qamar ............ G06Q 10/06398
                                                    705/7.42
2018/0075404 A1* 3/2018 Hendrickson ......... G06Q 50/04
2019/0258983 A1* 8/2019 Thomaidou .......... G06Q 10/067

OTHER PUBLICATIONS

Chandrasiri, N., et al., "Driving Skill Classification in Curve Driving Scenes Using Machine Learning", Journal of Modern Transportation, Apr. 23, 2016, pp. 196-206, vol. 24, Issue 3.

Miyashita, Y., et al., "Analyzing Fine Motion Considering Individual Habit for Appearance-Based Proficiency Evaluation", IECIE Transaction on Information and Systems, Jan. 2017, pp. 166-174, vol. E100-D, No. 1.

Kumar, A., et al., "A Smart Sensor-Based Software System for Driver Evaluation", Systems Conference, 4th Annual IEEE, Apr. 5-8, 2010, p. 472-477.

Ahmadi, A., et al. "Towards a Wearable Device for Skill Assessment and Skill Acqusition of a Tennis Player During the First Serve", Sports Technology 2009, pp. 129-136, vol. 2, No. 3-4.

\* cited by examiner

Operator list

| Operator | Year of service ▽ | Skill ▽ |
|---|---|---|
| 1 | 1 | beginner |
| 2 | 2 | intermediate |
| 3 | 4 | intermediate |
| 4 | 10 | expert |

March 2018

| S | M | T | W | T | F | S |
|---|---|---|---|---|---|---|
|   |   |   |   | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

Operation list

| # | Start ▽ | End ▽ | Operator ▽ | Product type ▽ | Score ▽ |
|---|---|---|---|---|---|
| 1 | 2018/03/28 10:23 | 2018/03/28 10:44 | 1 | A | 72 |
| 2 | 2018/03/28 10:45 | 2018/03/28 10:54 | 1 | A | 75 |
| 3 | 2018/03/28 11:00 | 2018/03/28 11:15 | 2 | B | 80 |
| 4 | 2018/03/28 11:16 | 2018/03/28 11:30 | 2 | B | 78 |

FIG. 4

| time | channel1 | channel2 | channel3 | ... |
|---|---|---|---|---|
| 2018/02/28 10:10:06:100 | 10.0 | 532.2 | 4.5 | ... |
| 2018/02/28 10:10:06:200 | 10.1 | 511.1 | 4.5 | ... |
| 2018/02/28 10:10:06:300 | 11.4 | 537.6 | 4.2 | ... |
| 2018/02/28 10:10:06:400 | 12.3 | 562.1 | 4.1 | ... |
| ... | ... | ... | ... | ... |

FIG. 6(a)

| shift # | start | end | channel3 | product type | ⋮ |
|---|---|---|---|---|---|
| 1 | 2018/02/28 10:00 | 2018/02/28 12:00 | 1 | A | ⋮ |
| 2 | 2018/02/28 12:00 | 2018/02/28 14:00 | 2 | B | ⋮ |
| 3 | 2018/02/28 14:00 | 2018/02/28 16:00 | 3 | A | ⋮ |
| 4 | 2018/02/28 16:00 | 2018/02/28 18:00 | 4 | C | ⋮ |
| ⋮ | ⋮ | ⋮ | ⋮ | ⋮ | ⋮ |

FIG. 6(b)

| operator # | year of service | skill level | |
|---|---|---|---|
| 1 | 1 | beginner | |
| 2 | 3 | intermediate | |
| 3 | 4 | intermediate | |
| 4 | 10 | expert | |
| ... | ... | ... | ... |

FIG. 6(c)

| operation # | start | end | operator | product type | ... |
|---|---|---|---|---|---|
| 1 | 2018/03/28 10:23 | 2018/03/28 10:44 | 1 | A | ... |
| 2 | 2018/03/28 10:45 | 2018/03/28 10:54 | 1 | A | ... |
| 3 | 2018/03/28 11:00 | 2018/03/28 11:15 | 2 | B | ... |
| 4 | 2018/03/28 11:16 | 2018/03/28 11:30 | 2 | B | ... |
| ... | ... | ... | ... | ... | ... |

FIG. 6(d)

| operation # | channel1_max | channel1_min | ... | channel2_max | channel2_min | ... |
|---|---|---|---|---|---|---|
| 1 | 15.2 | 8.1 | ... | 552.2 | 422.2 | ... |
| 2 | 17.4 | 10.3 | ... | 531.0 | 521.0 | ... |
| 3 | 21.1 | 15.6 | ... | 557.6 | 454.2 | ... |
| 4 | 18.0 | 10.1 | ... | 522.1 | 502.1 | ... |
| ... | ... | ... | ... | ... | ... | ... |

FIG. 6(e)

| # | feature | weight | preferable value | ... |
|---|---|---|---|---|
| 1 | channel3_mean | 10.2 | higher | ... |
| 2 | channel1_min | 8.4 | higher | ... |
| 3 | channel2_std | 6.1 | lower | ... |
| ... | ... | ... | ... | ... |

FIG. 6(f)

| operation # | score | key feature 2 | key feature 2 | key feature 3 | ... |
|---|---|---|---|---|---|
| 1 | 72 | 52 | 45 | 62 | ... |
| 2 | 75 | 64 | 36 | 75 | ... |
| 3 | 80 | 73 | 53 | 69 | ... |
| 4 | 78 | 63 | 54 | 35 | ... |
| ... | ... | ... | ... | ... | ... |

FIG. 6(g)

SYSTEM AND METHODS FOR OPERATOR PROFILING FOR IMPROVING OPERATOR PROFICIENCY AND SAFETY

BACKGROUND

Field

The present disclosure is generally directed to manufacturing and factory control processes, and more specifically, to systems and methods for operator profiling.

Related Art

In the related art, there are still human operated manufacturing and factory control processes in which human operators manipulate machines to do some tasks. For example, workers in a manufacturing plant may control equipment such as arm robots to produce products. Another example can involve driving a vehicle; a driver (operator) manipulates a car (machine). The method of operation can vary among operators depending on their skill level, preference, and environment unless the operation is fully automated. Clarifying such skill differences in operation and providing the results in an interpretable way can assist in evaluating operator skill, training beginners, modifying the manufacturing or factory process, and so on. Such process is referred herein as "operator profiling".

Several methods are known to do operator profiling in the related art. In a first related art method, body-attached sensors to record motion of the operator such as arm position, and analyzing the motion data to evaluate operators. A drawback of such a related art method is that it requires additional sensors to record the motion. Further attached sensors may inhibit the natural movement of the operator. In another related art method, video data is utilized to record the motion of the operator without inhibiting natural movement. However, such methods still require additional sensors such as video cameras, which may not always be available due to cost or privacy issues.

In another example related art method, existing sensor measurements are collected from machines. Such data is not necessarily collected for profiling operators but might be collected for monitoring equipment health to prevent machine failure. A couple of technologies are known for this category, but such related art implementations mainly limited to driver evaluation use cases.

In the related art, a driver evaluation system based on smart phone data has been implemented. Such implementations involve the calculation of metrics, which are related to operator skill. However, the metrics must be defined in advance and insight cannot be determined beyond pre-defined metrics.

In the related art, a machine learning based method is also utilized, which collects skilled and non-skilled driver data when the drivers are curving and build a classification model based on the data. Such implementations can apply the classification model to a new driver data and judge whether the driver is skilled or not. However, such implementations are applicable only for a very specific case, i.e., curve driving a particular corner, and not applicable to other use cases such as operators in manufacturing plant.

SUMMARY

Example implementations described herein are directed to systems and methods to profile machine operators based on pre-installed sensor measurement without additional sensors and manually designed metrics.

A system is provided for operator profiling based on pre-installed sensor measurement. A basic idea behind the example implementations described herein is that the system extracts a set of segmented time series data associated with a unit of operation and builds models which distinguish the operators by machine learning algorithms. The system uses the models to output the evaluation score assigned to each operation, identify the key movements for skill/non-skill operators, and recommend appropriate actions to improve operation skill.

Aspects of the present disclosure include a method, which can involve processing sensor data associated with an apparatus to extract features indicative of a skill level of an operator, the features determined from a machine learning process; determining the skill level of the operator from the extracted features; and adjusting scheduling of the operator based on the determined skill level.

Aspects of the present disclosure include a non-transitory computer readable medium, storing instructions for executing a process, which can involve processing sensor data associated with an apparatus to extract features indicative of a skill level of an operator, the features determined from a machine learning process; determining the skill level of the operator from the extracted features; and adjusting scheduling of the operator based on the determined skill level.

Aspects of the present disclosure include a system, which can involve means for processing sensor data associated with an apparatus to extract features indicative of a skill level of an operator, the features determined from a machine learning process; means for determining the skill level of the operator from the extracted features; and means for adjusting scheduling of the operator based on the determined skill level.

Aspects of the present disclosure can further include a first apparatus, involving a memory configured to manage a machine learning process, and a processor configured to process sensor data associated with an apparatus to extract features indicative of a skill level of an operator, the features determined from a machine learning process; determine the skill level of the operator from the extracted features; and adjust scheduling of the operator based on the determined skill level.

Through the example implementations described herein, the problems with the related art can be addressed through providing a system that does not require additional cameras or sensors other than the feedback normally provided from the apparatus to determine operator skill and adjusting scheduling of the operators according to the determined skill levels.

BRIEF DESCRIPTION OF DRAWINGS

FIG. 4 illustrates an example of a search interface, in accordance with an example implementation.

FIGS. 6(a) to 6(g) illustrate examples of management information in accordance with an example implementation.

DETAILED DESCRIPTION

Figure 1:
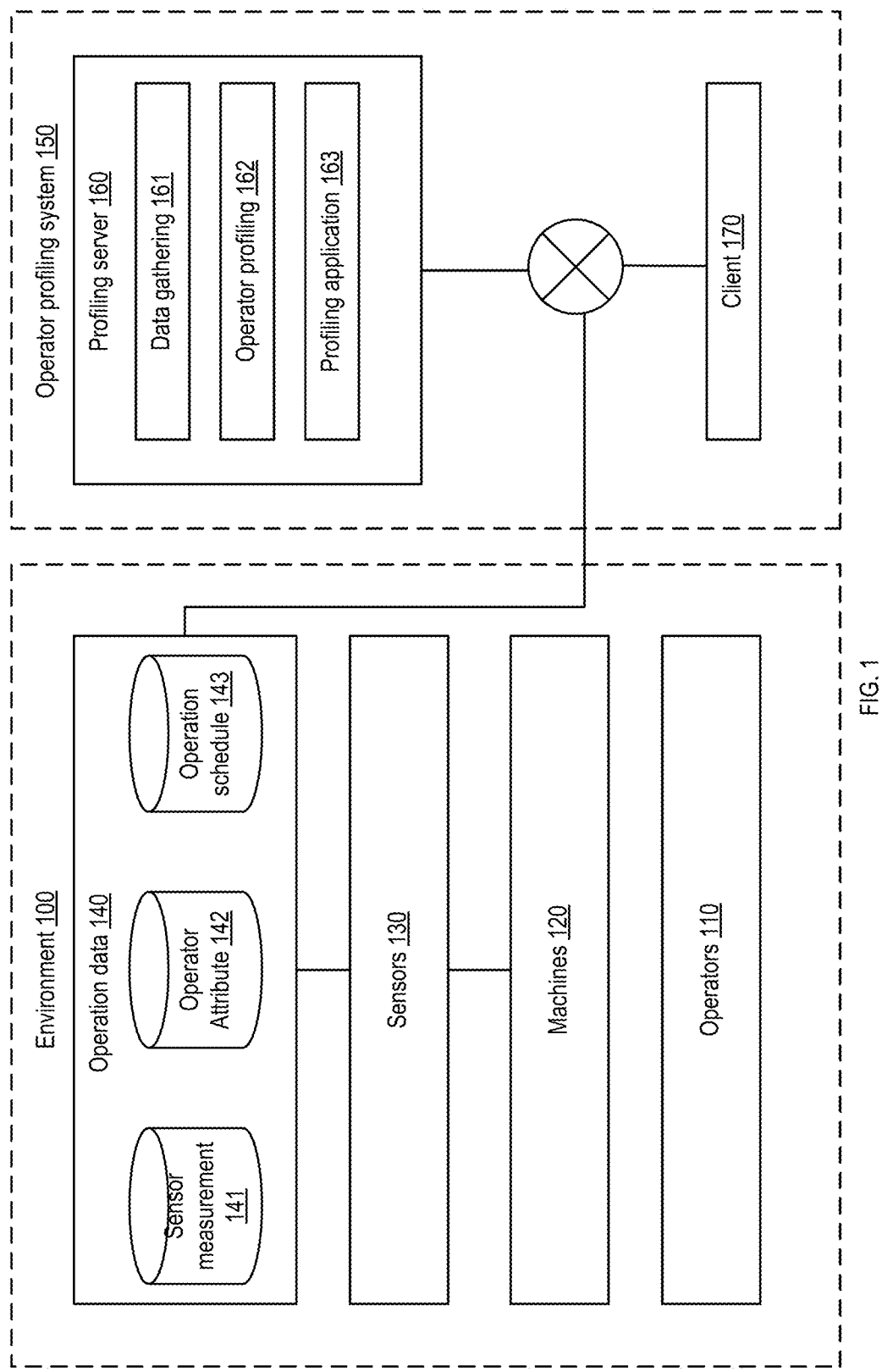
FIG. 1 illustrates an example system architecture, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

The present disclosure is directed to a method and system to profile machine operators based on pre-installed sensor measurement without attaching additional sensors and manually designing metrics.

FIG. 1 illustrates an example system architecture, in accordance with an example implementation. Environment 100 includes operators 110, machines 120, sensors 130, and operation data 140. Operators 110 manipulate machines 120 and sensors 130 attached to the machines 120 output sensor measurement 141. Sensor measurement 141 is time series data which is indicative of machine movement or status such as speed, temperature, pressure, and so on in accordance with the desired implementation. Operation data 140 includes operator attributes 142 and operation schedule 143 in addition to sensor measurement 141. Operator attribute 142 is indicative of the identification (e.g. name) and skill level of the operator. The skill level can be described by year-of-service, labels like beginner or expert, and so on, in accordance with the desired implementation. Operation schedule 143 contains the information regarding when an operator worked on the system (e.g. start and end time with operator's name). Operator profiling system 150 includes a profiling server 160 and client 170. Profiling server 160 contains data gathering 161, operator profiling 162 and profiling application modules 163. Data gathering module 161 transfers the operation data 140 from the existing environment 100 and passes the data to operator profiling module 162. Such data transfer can be done in real time or batch processing. Operator profiling module 162 analyzes operation data 140 and generates the operator profile. Profiling application module 163 is configured to, but is not limited to, the following processes:

1) Reporting, which visualizes each operator's profile on a dashboard,
2) Ranking among a group of operators to promote proficiency improvement,
3) Risk alert to improve safety,
4) Training and operating recommendation.

Operator profiling applications can be accessed from client 170.

Figure 2:
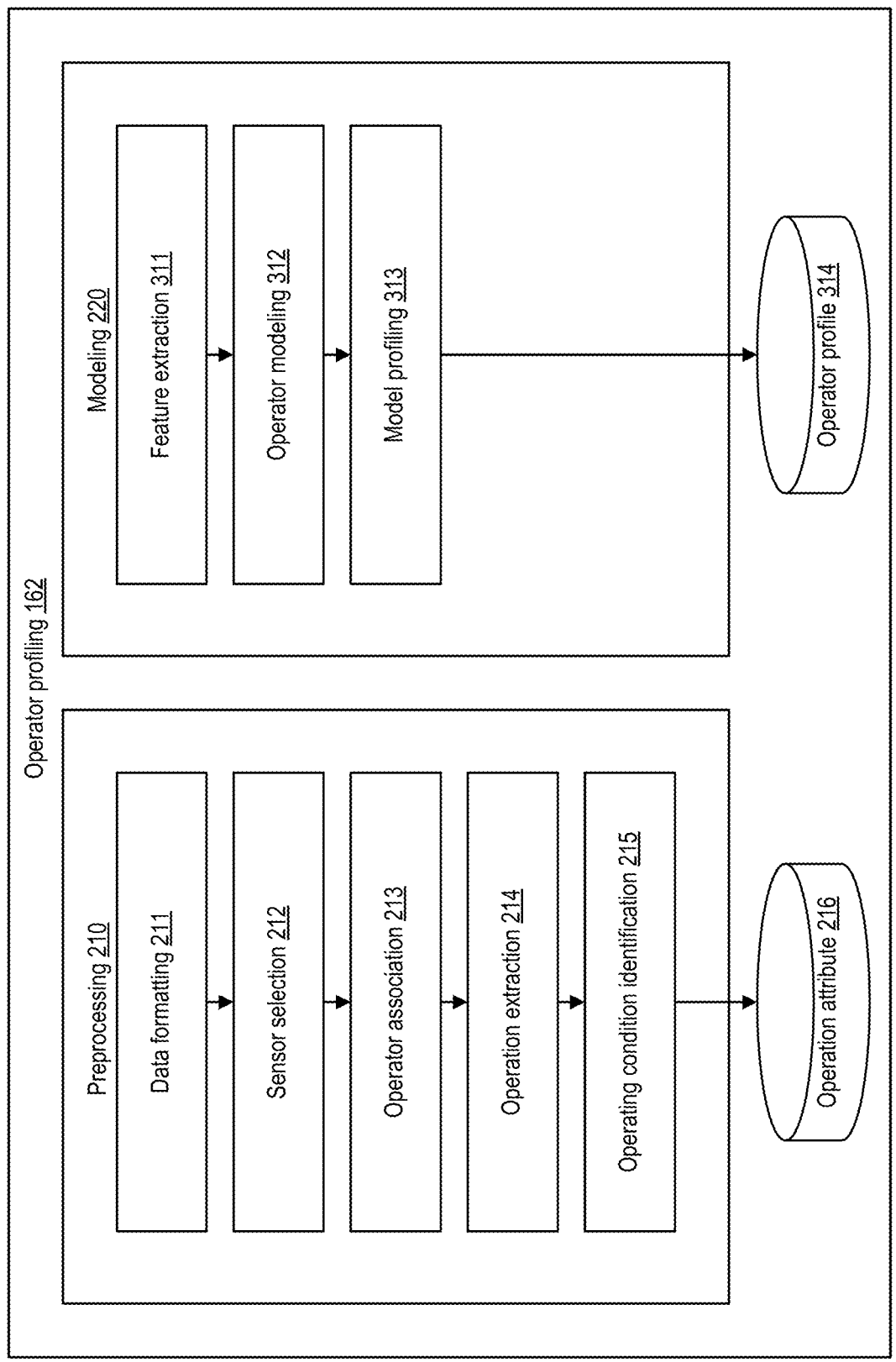
FIG. 2 illustrates detailed functions of the operator profiling system, in accordance with an example implementation.

FIG. 2 illustrates detailed functions of the operator profiling system 162, in accordance with an example implementation. At a high level, the system 162 involves three modules: data pre-process 210, operator profiling modeling 220, and applications on top of profiling. Further detail for each module is provided herein.

Data formatting 211 is configured to convert the raw sensor measurement into an appropriate format. An example of sensor measurement after data formatting is shown in FIG. 6(a). The sensor measurement can include time and multiple channels. Each channel data comes from a sensor attached to a machine. A channel can represent a speed of a motor, an angle of an arm robot and so on, in accordance with the desired implementation.

Sensor selection 212 is configured to remove irrelevant or redundant channels from the sensor data. For example, sensor measurement may contain multiple channels (channel1, channel2, . . . ), but not necessarily all channels are related with operator actions. Some channel data might be automatically generated regardless of operator actions. Or multiple channels may provide essentially the same information (e.g., one channel might be just a copy of another time series with different scale). Sensor selection 212 thereby removes such irrelevant or redundant channels. To remove irrelevant data, sensor selection 212 utilizes information about the environment 100 that tells which sensor is related with which operator actions. If there is uncertainty regarding which channels are related with which operator actions, all channels are included without elimination. To remove redundant channels, information regarding the environment 100 is utilized. Another way is to decide redundant channels based on the data. If the correlation of two channels is higher than a threshold (e.g., 0.90), one of the channels is discarded.

Operator association 213 is configured to split sensor measurement into segments. Typically, a machine records its movement and status, but does not record any information regarding an operator who manipulates the machine. In order to associate sensor measurement with operators, the system uses the operator schedule. The operator schedule as shown in FIG. 6(b) contains start and end time for each operator. Using this information, operator association module 213 splits sensor measurement into segments. In addition to operator identification, operator schedule can include additional information such as a product type the operator worked on during the shift.

Operation extraction 214 extracts unit operations from sensor measurements. In many cases, an operator repeats a series of manipulations. For example, a worker applies the same series of manipulations on each material in a manufacturing process. Such series of manipulations are referred to as "unit operations" or "operations". Operation extraction module 214 extracts such unit operations from sensor measurement. When the relation between sensor measurement and boundary of the operations are known, which gives start and end points for a unit operation, the module 214 extracts an operation based on that information. For example, channel1 takes a particular value (e.g. 100) when a new material comes in a machine and channel2 takes a particular value (e.g. 0) when a process for this material finishes. The module 214 uses such values as indicators to identify the start and end points of the operation. In the case that such a relation is unclear or not available, the module 214 splits sensor measurement into a constant period (e.g. 1 min) and use a segment as unit operation. At the end of this process, the system stores a set of operations.

Operating condition identification 215 is configured to assign the operating condition for each operation extracted by operation extraction module 214. Operating condition is additional information such as a product type an operator is working on or other data of interest in accordance with a desired implementation. The module 215 extracts the operating condition from the operation schedule if available. Even when there is no explicit information for the operating condition, the module 215 extracts the operating condition based on the sensor measurement through utilizing pattern matching. For example, if the value of channel3 is known to differ depending on the product type, the module 215 judges the product type of an operation based on the channel3 value. The purpose of taking operation condition into account is to build an operator profile depending on operation condition. For example, a product type worked on could affect the operation and it is reasonable to make operating profile for each product type.

Figure 3:
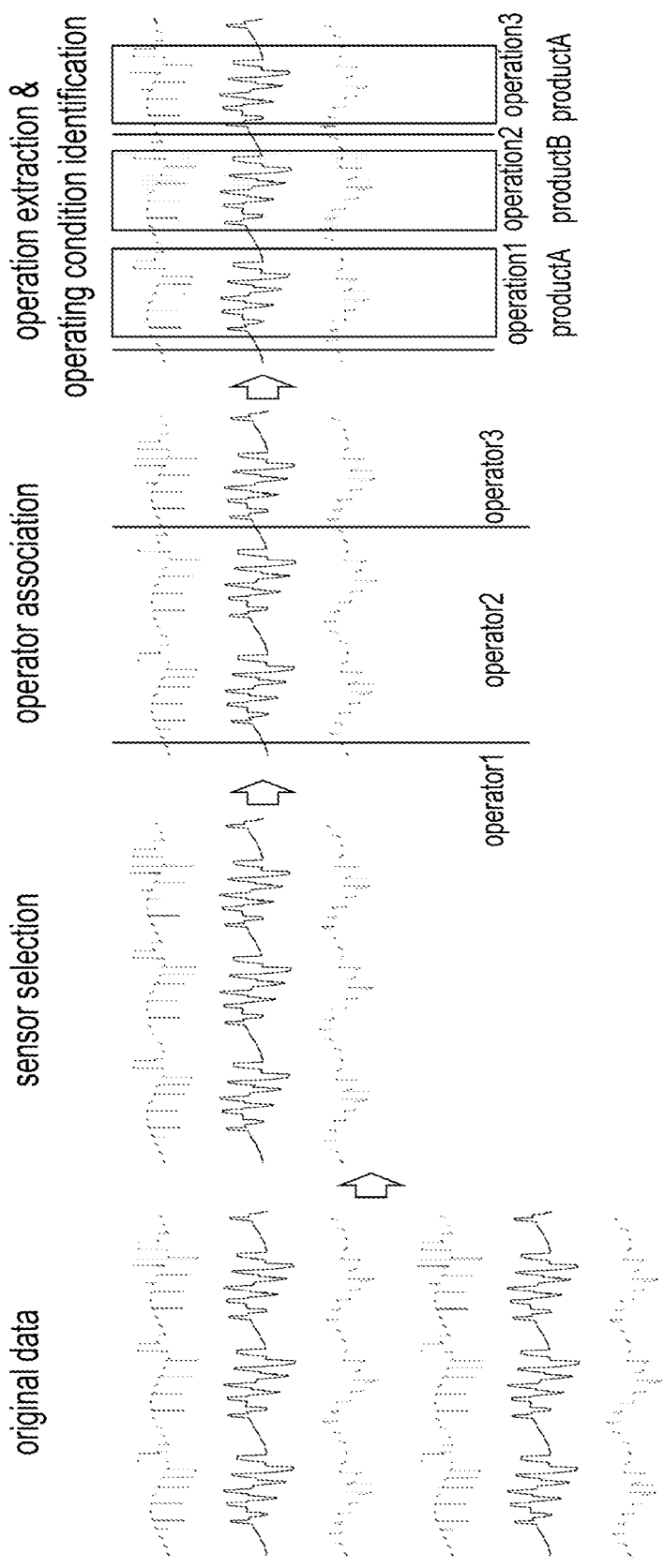
FIG. 3 illustrates how the original sensor measurement is preprocessed through the steps of FIG. 2, in accordance with an example implementation.

FIG. 3 illustrates how the original sensor measurement is preprocessed through the steps of FIG. 2, in accordance with an example implementation. At the end of the preprocess, the system has extracted a set of operations associated with operators and operating conditions and stores those information into operation attribute 216. FIG. 6(d) illustrates an example of operation attribute 216. Operation attribute 216 contains information such as operation identification, start and end time for the operation, operator and operation condition such as product type.

Feature extraction 311 is configured to extract features from sensor measurement on each unit operation. The features are a multi-dimensional vector calculated from sensor measurement. An element of a vector represents statistical attributes of sensor measurement such as mean, minimum, maximum, standard deviation, autocorrelation for one channel and correlation between two channels. More complex features can be defined, if necessary for the desired implementation. FIG. 6(e) illustrates an example of features extracted. A record gives feature vector for a unit operation.

Operator modeling 312 builds a mathematical model based on the set of features and operator attribute. This is done by machine learning algorithms. Machine learning algorithms can be selected depending on a label in operator attribute that is used. A label can be selected from operator attributes (see FIG. 6(c)). When the difference among individual operators can be visualized, the module 312 uses operator identification (operator id) as a label. The module 312 builds a multi-class classification model. A variety of algorithms can be utilized for the multi-class classification model such as support vector machine (SVM), random forest, artificial neural network (ANN). When the relation with year of service needs to be visualized, the module 312 builds a regression model using year of service as a target value. Regression algorithms such as SVM and ANN can be utilized. When the relation with skill levels is to be visualized, the module 312 builds a binary classification model for two skill levels, and ranking model for more than two skill levels. Any method to learn ranking can be utilized as known in the art. Based on the selected label type, the module 312 joins a label to a feature vector using its operation id as the key.

Model profiling 313 is configured to output operator profile based on the model operator modeling module built. Operator profile 314 has several components as follows.

Key operator features: Once the operator modeling module 312 build a classification model for individual operators, important features can be selected from a model. For example, when linear SVM is utilized for classification, the weight for each feature can be obtained from the coefficients of the model. The module 313 decides key operator features by selecting features which have high absolute weight values. Such key features can contribute to differentiate between individual operators.

Key skill features: The same process in key operator features can be applied to get key skill features from a model built based on the skill level. When skill level is used for a target label, the module 313 can give the preferable values. FIG. 6(f) shows an example of key features, in accordance with an example implementation. In the table illustrated in FIG. 6(f), the mean of channel3 is ranked as the most important feature and the preferable value is "higher", which indicates that high skill operators tend to have high mean value for channel3.

Skill score: This module 313 calculates a score for an operation based on the skill model. In case the skill model is a binary classification (e.g., not skilled or skilled), the module 313 takes sensor measurement of an operation and converts the features by feature extraction module 311. Then, the module 313 calculates the probability that an operation belongs to a skilled operator. Standard machine learning classification algorithms are able to calculate this probability once a model is trained. In case the skill levels have more than two classifications, the module 313 calculates the score for an operation based on the ranking model. FIG. 6(g) shows an example of operator profile. Operator profile contains a score and key features. Key features are normalized values of features listed as key skill features. The model profiling module 313 outputs an operator profile 314 on an operation. The module 313 can get an operator profile 314 on an operator by taking average over operator profiles belonging to the operator. Thus, through the processing of sensor data associated with the apparatus operated on by the operator, features can be extracted whereupon the skill level of the operator can be determined according to the desired skill scoring method.

In example implementations, there can be profiling applications configured to conduct reporting, which involves visualization functions to show the result calculated from the operator profiling module 162. There can be two main functions for profiling applications, which include operation searching and operator profile visualization. The searching function enables a user to search an operation that the user wants to see. FIG. 4 illustrates an example of a search interface, in accordance with an example implementation. A user can search an operation by date, operator, and so on, in accordance with the desired implementation. The interface can also provide a ranking of an operator or multiple operators based on the determined skill level, upon which it can evaluate the operator for promotions based on the determined skill level. For example, if an operator increases their skill level such that they are categorized at a new skill level, then the operator is flagged to be promoted to a new position, or is automatically scheduled to operate at higher paying schedule shifts or more critical schedule shifts depending on the desired implementation.

Figure 5:
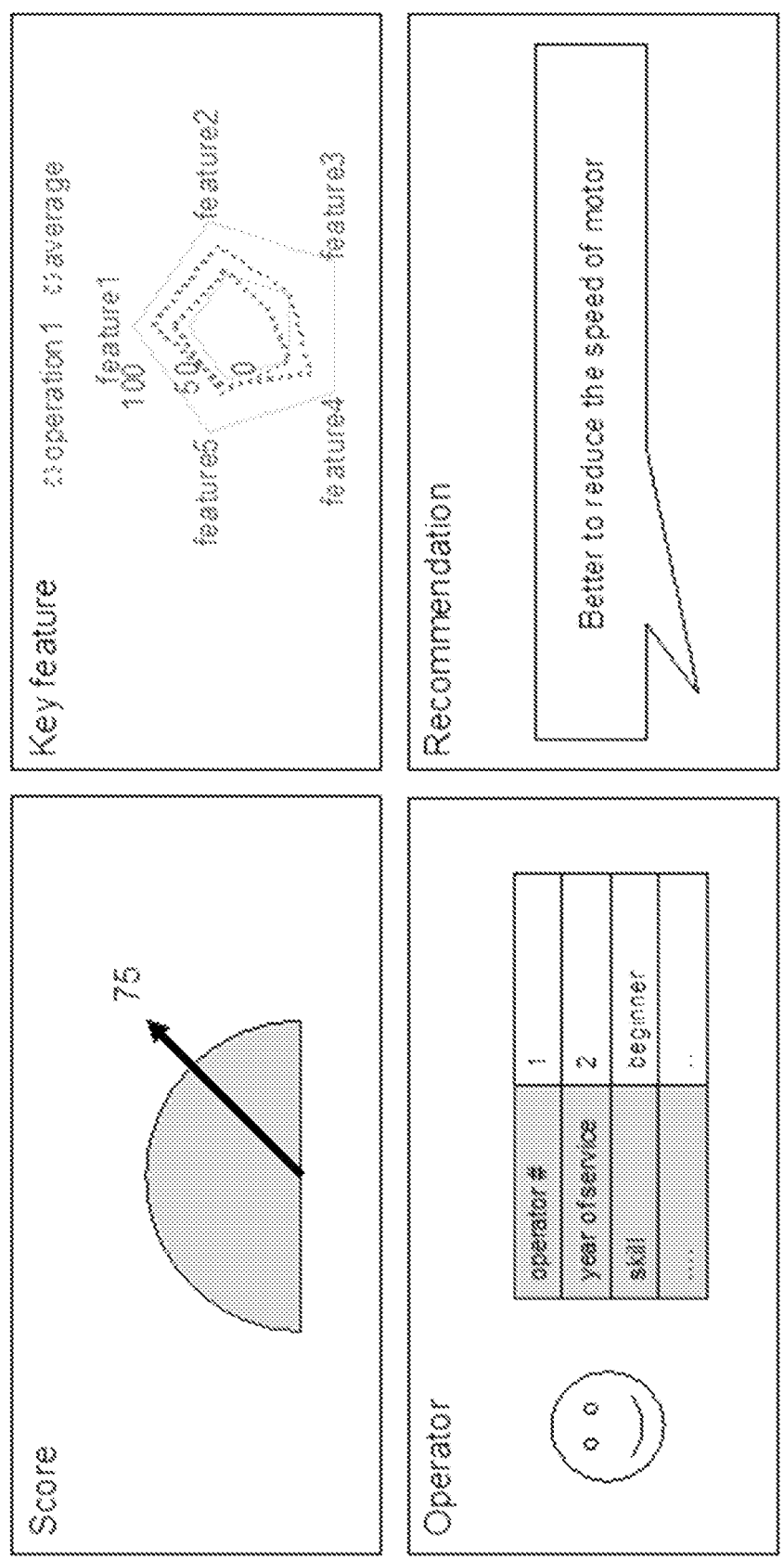
FIG. 5 illustrates an example of charts to visualize an operator profile, in accordance with an example implementation.

Once a user selects an operation, the visualization function provides charts to show an operator profile. FIG. 5 illustrates an example of charts to visualize an operator profile, in accordance with an example implementation. In the key feature chart, the key features for a selected operation are displayed with average values for the operator. In the recommendation chart, recommended actions for improving the skill of the operator are displayed. A recommended action is determined based on pre-defined rules and key features. For example, a message "Better to reduce the speed of motor" is displayed when the value of feature4 is less than pre-defined threshold. Through such functions, the interface can provide recommendations and training guidelines to the operator based on the determined skill level. For example, the interface can execute training programs for the operator while the operator is operating the apparatus based on the determined skill level that demonstrate needed corrections to the operator, and can also provide reports for recommended courses of action to improve skill level.

Other actions may also be specified through the interfaces of FIGS. 4 and 5, and the present disclosure is not limited thereto. For example, the scheduling of the operator can be adjusted based on the determined skill level. In an example implementation, certain time schedules can be designated as only allowing operation of the apparatus by operators above a certain skill level. The operator can have their schedule adjusted to operate the apparatus during those time schedules if the operator meets the requisite skill level, or can be removed from such time schedules depending on the desired implementation. In another example implementation, operators that require more training can be scheduled to operate the apparatus at a designated time, in which case training programs can be executed to guide the operators in operating the apparatus.

Figure 7:
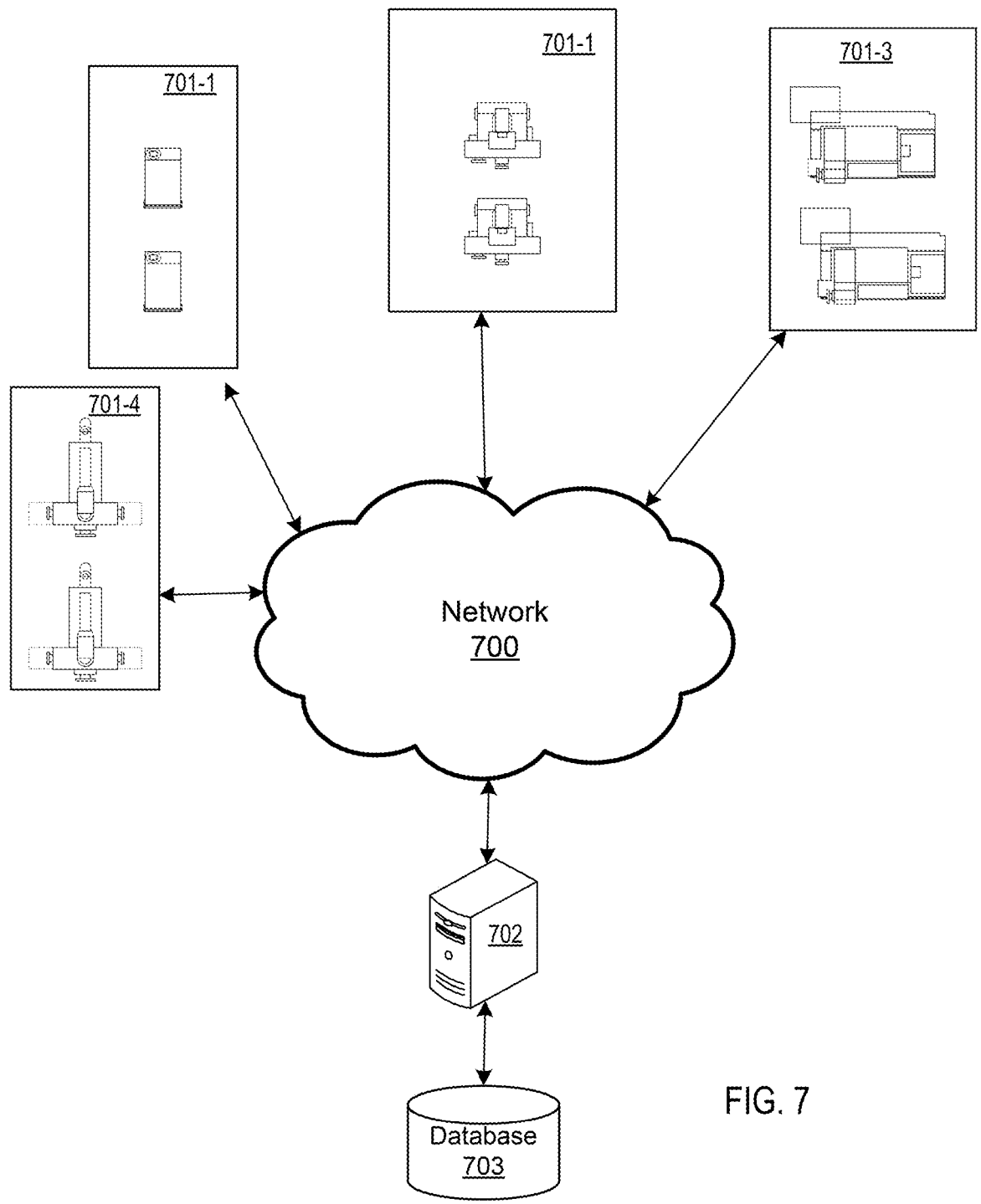
FIG. 7 illustrates a plurality of systems and a management apparatus, in accordance with an example implementation.

FIG. 7 illustrates a plurality of systems and a management apparatus, in accordance with an example implementation. One or more systems 701-1, 701-2, 701-3, and 701-4 are communicatively coupled to a network 700 which is connected to a management apparatus 702. The management apparatus 702 manages a database 703, which contains data feedback aggregated from the systems in the network 700. In alternate example implementations, the data feedback from the systems 701-1, 701-2, 701-3, and 701-4 can be aggregated to a central repository or central database such as proprietary databases that aggregate data from systems such as enterprise resource planning systems, and the management apparatus 702 can access or retrieve the data from the central repository or central database. Such systems can include apparatuses to be operated on by an operator for manufacturing or other processes, such as lathes, presses, mills, grinders, and so on, as well as mobile apparatuses such as forklifts, cranes, trucks as well as any other apparatuses that are to be operated on by an operator for the purposes of a manufacturing, factory, or other process.

Figure 8:
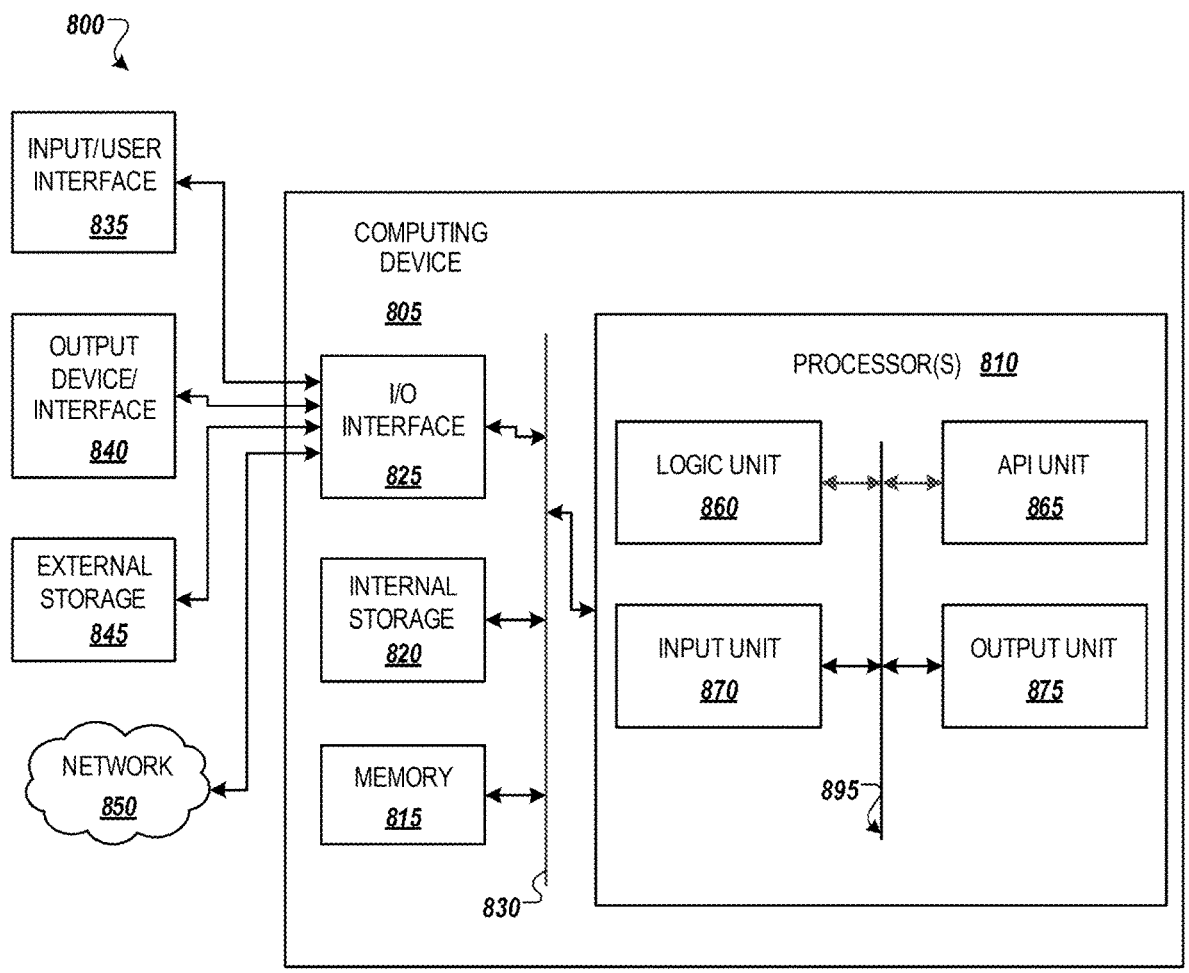
FIG. 8 illustrates an example computing environment with an example computer device suitable for use in some example implementations.

FIG. 8 illustrates an example computing environment with an example computer device suitable for use in some example implementations, such as a management apparatus 702 as illustrated in FIG. 7. Functionality described herein can be implemented at the management apparatus 702, or facilitated through a system based on some combination of elements, depending on the desired implementation.

Computer device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computer device 805. I/O interface 825 is also configured to receive images from cameras or provide images to projectors or displays, depending on the desired implementation.

Computer device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via I/O interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, input unit 870, output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide output based on the calculations described in example implementations.

In an example implementation, processor(s) 810 can be configured to process sensor data associated with an apparatus (e.g., from an apparatus to be operated by an operator as illustrated in FIG. 7) to extract features indicative of a skill level of an operator, wherein the features determined from a machine learning process as described for example, in FIG. 3 with regards to feature extraction 311 and operator modeling 312 and as illustrated in FIGS. 6(*e*) and 6(*f*). Processor(s) 810 can also be configured to determine the skill level of the operator from the extracted features as described with respect to model profiling 313 and operator profile 314 of FIG. 3, and adjust scheduling of the operator based on the determined skill level as described with respect to FIGS. 4 and 5. In an example implementation, processor(s) 810 can be configured to determine the skill level of the operator based on the extracted features through constructing a model for the operator based on the extracted features, wherein the model is at least one of a regression model associated with a time of service of the operator, and a binary classification model indicative of a plurality of skill levels for operation of the apparatus as described with respect to FIG. 3. Further, in an example implementation, processor(s) 810 can be configured to process sensor data associated with the apparatus to extract features indicative of the skill level of the operator through extracting unit operations from the sensor data based from matching sensor data patterns associated with unit operations to the sensor data; and associating the unit operations with the operator as described with respect to FIGS. 2 and 3.

In an example implementation, processor(s) 810 can also be configured to provide at least one of recommendations and training guidelines to the operator based on the determined skill level as illustrated in FIG. 5. Such recommendations can include interpretable or automatic recommendations and can also involve the execution of training programs as described in FIG. 5.

In an example implementation, processor(s) 810 can also be configured to conduct a ranking of the operator from the determined skill level; and evaluate the operator for promotions based on the determined skill level as described with respect to FIGS. 4 and 5.

In an example implementation, processor(s) 810 can be configured to process sensor data associated with an apparatus to extract features indicative of the skill level of the operator through determining a start time and a stop time for a unit operation from the sensor data based on boundary conditions associated with the unit operation as described with respect to FIGS. 2, 3 and 6(*b*).

In an example implementation, processor(s) 810 can be further configured to determine a product type associated with the apparatus, wherein the apparatus is configured to operate on a manufacturing process associated with the product type, and wherein the extracted features are selected based on the product type as described with respect to FIGS. 2 and 3. For example, processor(s) 810 can be configured to determine the product type associated with the apparatus through conducting pattern extraction on the sensor data to identify the product type as described with respect to FIGS. 2 and 3.

In an example implementation, processor(s) 810 can be configured to process sensor data associated with the apparatus to extract features indicative of the skill level of the operator through, for a classification model generated through the machine learning process, the classification model indicative of a plurality of skill levels for operation of the apparatus, selecting features from the classification model indicative of the plurality of skill levels as described with respect to FIG. 3.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
    processing sensor data associated with an apparatus to extract features indicative of a skill level of an operator, the features determined from a machine learning process;
    determining a product type associated with the apparatus, wherein the apparatus is configured to operate on a manufacturing process associated with the product type, and wherein the extracted features are selected based on the product type;
    determining the skill level of the operator from the extracted features;
    generating an operator profile based on the skill level of the operator and the extracted features, the operator profile configured to be provided to a visualization dashboard with one or more recommendations derived from the extracted features;
    and adjusting scheduling of the operator based on the determined skill level;
    wherein the processing the sensor data associated with the apparatus to extract features indicative of a skill level of the operator comprises:
        identifying, from a plurality of data channels associated with the manufacturing process, each of the plurality of data channels comprising sensor data of a sensor of the apparatus operating on the manufacturing process, wherein one or more of the plurality of data channels are indicative of the product type associated with the apparatus, ones of a plurality of data channels related to action by the operator on the apparatus;
        determining time segments for the ones of the plurality of data channels based on a current scheduling of the operator for the apparatus and the determined product type;
        determining unit operations executed on the apparatus by the operator within the time segments of the plurality of data channels, each of the unit operations indicative of a series of manipulations made from the apparatus to the manufacturing process associated with the product type as caused by the action by the operator on the apparatus; and
        extracting the features from the sensor data associated with the unit operations.

2. The method of claim 1, further comprising providing at least one of recommendations and training guidelines to the operator based on the determined skill level.

3. The method of claim 1, further comprising:
    conducting ranking of the operator from the determined skill level; and
    evaluating the operator for promotions based on the determined skill level.

4. The method of claim 1, wherein the determining the skill level of the operator based on the extracted features comprises constructing a model for the operator based on the extracted features, wherein the model is at least one of a regression model associated with a time of service of the operator, and a binary classification model indicative of a plurality of skill levels for operation of the apparatus.

5. The method of claim 1, wherein the processing sensor data associated with an apparatus to extract features indicative of the skill level of the operator comprises determining a start time and a stop time for a unit operation from the sensor data based on boundary conditions associated with the unit operation.

6. The method of claim 1, wherein the determining the product type associated with the apparatus comprises conducting pattern extraction on the sensor data to identify the product type.

7. The method of claim 1, wherein the processing sensor data associated with the apparatus to extract features indicative of the skill level of the operator comprises:
    extracting unit operations from the sensor data based from matching sensor data patterns associated with unit operations to the sensor data; and
    associating the unit operations with the operator.

8. The method of claim 1, wherein the processing sensor data associated with the apparatus to extract features indicative of the skill level of the operator, the features determined from the machine learning process, comprises,
    for a classification model generated through the machine learning process, the classification model indicative of a plurality of skill levels for operation of the apparatus, selecting features from the classification model indicative of the plurality of skill levels.

9. A non-transitory computer readable medium, storing instructions for executing a process, the instructions, comprising:
    processing sensor data associated with an apparatus to extract features indicative of a skill level of an operator, the features determined from a machine learning process;
    determining a product type associated with the apparatus, wherein the apparatus is configured to operate on a manufacturing process associated with the product type, and wherein the extracted features are selected based on the product type;

determining the skill level of the operator from the extracted features;

generating an operator profile based on the skill level of the operator and the extracted features, the operator profile configured to be provided to a visualization dashboard with one or more recommendations derived from the extracted features; and adjusting scheduling of the operator based on the determined skill level;

wherein the processing the sensor data associated with the apparatus to extract features indicative of a skill level of the operator comprises:

identifying, from a plurality of data channels associated with the manufacturing process, each of the plurality of data channels comprising sensor data of a sensor of the apparatus operating on the manufacturing process, wherein one or more of the plurality of data channels are indicative of the product type associated with the apparatus, ones of a plurality of data channels related to action by the operator on the apparatus;

determining time segments for the ones of the plurality of data channels based on a current scheduling of the operator for the apparatus and the determined product type;

determining unit operations executed on the apparatus by the operator within the time segments of the plurality of data channels, each of the unit operations indicative of a series of manipulations made from the apparatus to the manufacturing process associated with the product type as caused by the action by the operator on the apparatus; and extracting the features from the sensor data associated with the unit operations.

10. The non-transitory computer readable medium of claim 9, the instructions further comprising providing at least one of recommendations and training guidelines to the operator based on the determined skill level.

11. The non-transitory computer readable medium of claim 9, the instructions further comprising:

conducting ranking of the operator from the determined skill level; and evaluating the operator for promotions based on the determined skill level.

12. The non-transitory computer readable medium of claim 9, wherein the determining the skill level of the operator based on the extracted features comprises constructing a model for the operator based on the extracted features, wherein the model is at least one of a regression model associated with a time of service of the operator, and a binary classification model indicative of a plurality of skill levels for operation of the apparatus.

13. The non-transitory computer readable medium of claim 9, wherein the processing sensor data associated with an apparatus to extract features indicative of the skill level of the operator comprises determining a start time and a stop time for a unit operation from the sensor data based on boundary conditions associated with the unit operation.

14. The non-transitory computer readable medium of claim 9, wherein the determining the product type associated with the apparatus comprises conducting pattern extraction on the sensor data to identify the product type.

15. The non-transitory computer readable medium of claim 9, wherein the processing sensor data associated with the apparatus to extract features indicative of the skill level of the operator comprises:

extracting unit operations from the sensor data based from matching sensor data patterns associated with unit operations to the sensor data; and associating the unit operations with the operator.

16. The non-transitory computer readable medium of claim 9, wherein the processing sensor data associated with the apparatus to extract features indicative of the skill level of the operator, the features determined from the machine learning process, comprises, for a classification model generated through the machine learning process, the classification model indicative of a plurality of skill levels for operation of the apparatus, selecting features from the classification model indicative of the plurality of skill levels.

* * * * *